July 30, 1968  A. METCALFE  3,394,627
EXPANSIVE ANCHORING DEVICE
Filed July 13, 1967  4 Sheets-Sheet 1
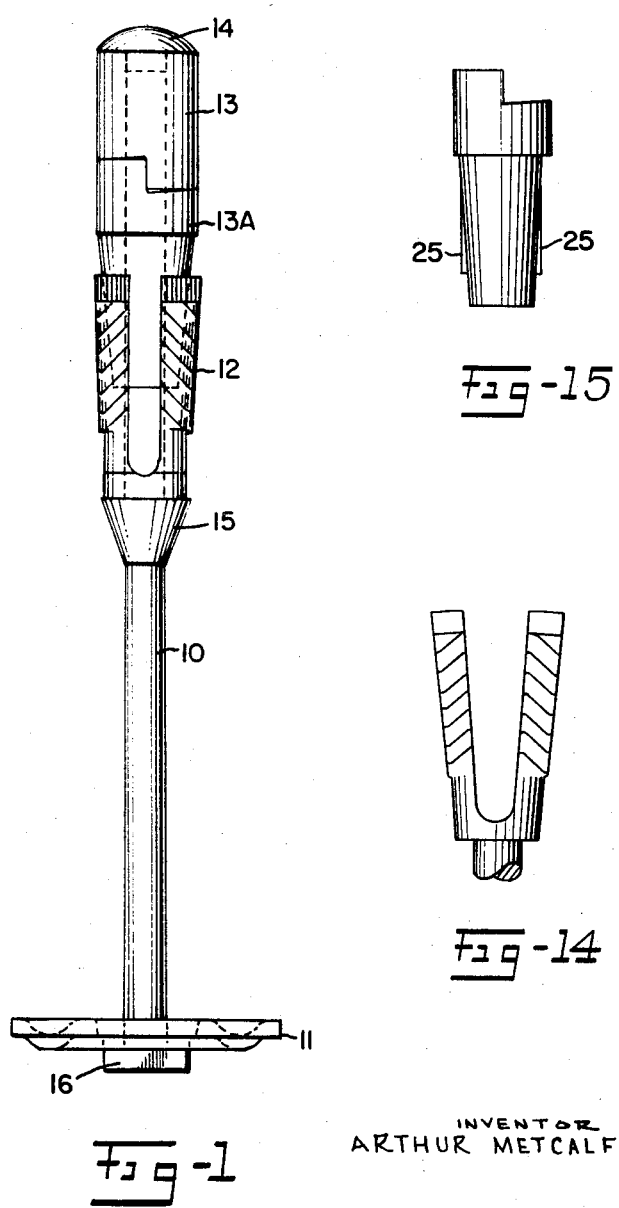
INVENTOR
ARTHUR METCALFE

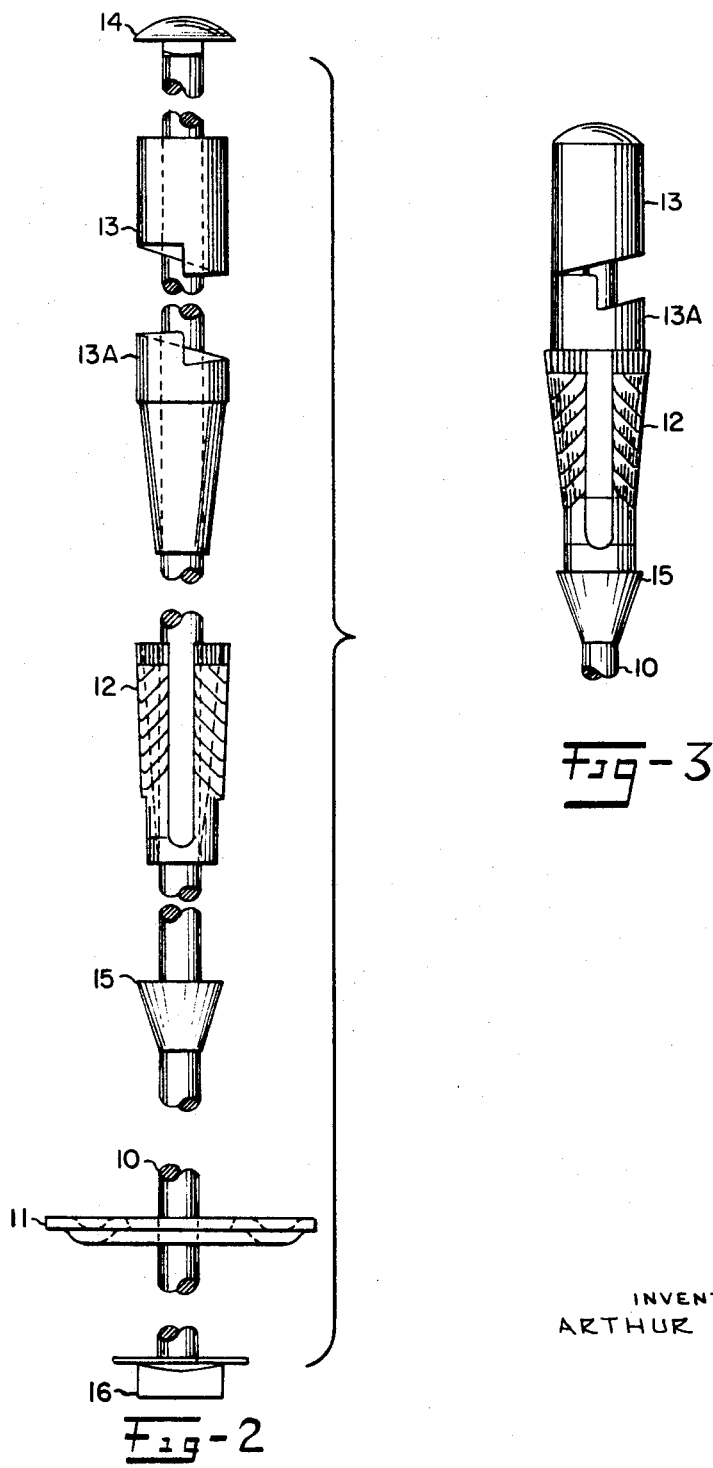

July 30, 1968 A. METCALFE 3,394,627
EXPANSIVE ANCHORING DEVICE
Filed July 13, 1967 4 Sheets-Sheet 3

INVENTOR
ARTHUR METCALFE

INVENTOR
ARTHUR METCALFE

United States Patent Office 3,394,627
Patented July 30, 1968

3,394,627
EXPANSIVE ANCHORING DEVICE
Arthur Metcalfe, 314 Orchard Ave.,
Beckley, W. Va. 25801
Continuation-in-part of application Ser. No. 458,974,
May 25, 1965. This application July 13, 1967, Ser.
No. 660,147
10 Claims. (Cl. 85—73)

ABSTRACT OF THE DISCLOSURE

An improvement in expansive anchoring devices of the type involving the interaction of an expansible member in frictional engagement with the inner surface of a cylindrical chamber. The frictional engagement is effected by the wedging action of an expander member coacting with the expansible member in a conventional manner and in which the expander member is displaced into operating position by the force applied through the rotation of a cam device acting upon a cam follower positioned on the expander device.

---

This application is a continuation-in-part of copending application, Ser. No. 458,974, filed May 25, 1965, now abandoned, the benefit of which filing date for subject matter common to both applications, is claimed.

This invention is directed to an improvement in expansive anchoring devices of the kind that are utilized in connection with holes and other suitable apertures formed in rock, concrete, wood, metal, plastic, plaster and other substrates of suitable structural integrity. In its simplest form the device usually consists of a threaded bolt, a U-shaped expansible unit containing an aperture in the connecting portion between the two legs of the U to permit passage of the bolt in sliding relation, and a wedged-shaped part containing a central threaded aperture to mate with the threaded bolt. In the assembled anchoring device the bolt passes through the expansible device with the legs of the expansible device extending away from the head of the bolt and thence threaded into the expander device with the small end of the wedge directed between the legs of the expansive device. When placed within a cylindrical bore only slightly greater in diameter than the distance between the outer surfaces of the U-shaped expansible device, and the bolt is turned, the wedge advances between the legs of the expansible device forcing them apart and into frictional contact with the walls of the bore hole. In this manner the anchor device is secured and the bolt head projecting outside the aperture provides the desired attachment point.

Practically all such devices known heretofore have relied upon the rotating action of a threaded portion of the main structural bolt member to advance the expander wedge into the expansible member to cause the expansible member to be deflected laterally against the bore hole surface. The foregoing is well illustrated by Paine in U.S. Patent 1,031,462; Caprosso in U.S. Patent 1,419,016; Williams et al. in U.S. Patent 3,139,730 and Bieser, in 3,247,754.

As can be seen from the above patents and other prior art these devices are applicable to a variety of uses ranging from the provision of anchor supports for cables in supporting bridge structures, anchor points for structural members in buildings, for securing machinery to foundations, as roof bolts to stabilize rock in tunnels, to providing support for pictures and display items. The devices are offered for use in connection with drilled holes ranging in size from a fraction of an inch to several inches in diameter.

In the use of expansible anchoring devices as roof bolts in mine tunneling operations, one of the troublesome features involved in the use of such devices utilizing a screw thread to advance the expander is the occasional false indication that a secure anchor has been achieved when the turning forces, utilized to set the anchor, reach the expected limit associated with a satisfactory installation. Frequently dirt and refuse accumulated in the threads or collected therein during installation increase the torque required to rotate the bolt and in some instances to actually jamb the threads so further rotation is impossible. Such additive resistance or actual jambing of the threads tend to indicate to the operator that a satisfactory installation has been achieved when in fact the degree of pressure developed against the side wall is considerably less than adequate for a safe and secure installation.

Another difficulty encountered with the screw thread device is that on occasion sufficient torque is applied to the screw thread that the compressive strength of the side wall of the bore-hole is exceeded by the pressure of the expansible unit and the material tends to crumble. Such conditions are difficult, if not impossible to detect under those conditions normally existing during the installation of such devices.

A third deficiency stemming from the use of screw threads is the cumulative amount of time involved in advancing the expander wedge into operating position and then on into the final wedged position. It is not uncommon for such operations to require up to twenty or more revolutions of the bolt to achieve a firm anchor. In those instances where such screw-thread operated devices are utilized in mine-roof bolting operations when a number of such devices are used for each yard of tunnel length, the installations become time-consuming and may actually impede the orderly conduct of the mining operations.

These and other difficulties are overcome by the invention described and claimed herein. More particularly, it has been found that through the use of any one of several cam surfaces, sufficient axial thrust may be imparted, within one revolution of the bolt or rigid member to develop the required frictional engagement between the expansible unit and the inner surface of the bore-hole. The action of the cam surfaces is not impaired by the quantity of dirt and refuse that renders the screw-thread anchors inoperative. Any overstressing of the side wall through excess pressure from the cam that leads to even a partial collapse of the wall-structure permits the cam surface to be rotated to the end of its pitch thus releasing positive pressure on the expansible unit and permitting the anchor assembly to release. The resultant loosened condition of the anchor assembly is readily detectible thus making evident the faulty installation.

These and other objectives are apparent from the following description of the accompanying drawings which illustrate several of the embodiments of the invention which is particularly set forth in the claims.

In the drawings:

FIGURE 1 is an elevation view of the expansive anchoring device.

FIGURE 2 is an elevation view showing a breakaway of the components of the assembly shown in FIGURE 1.

FIGURE 3 is a view of the operating portion of the assembly illustrating the expander unit seated within the multiple segmented expansible unit at partial expansion.

Figure 13:
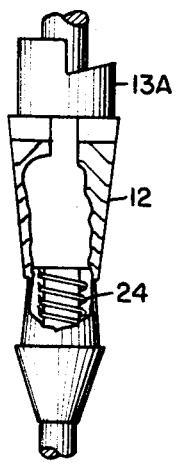

FIGURE 13 illustrates a spring device 24 positioned between and in abutting relationship with the end of tapered expander 13-A and the ring support of expansible member 12.

FIGURE 14 illustrates a multiple-segmented expansible unit capable of being mated with an alternative form of tapered expander 13-A showing flutes or guides 25 as illustrated in FIGURE 15.

Figure 4:
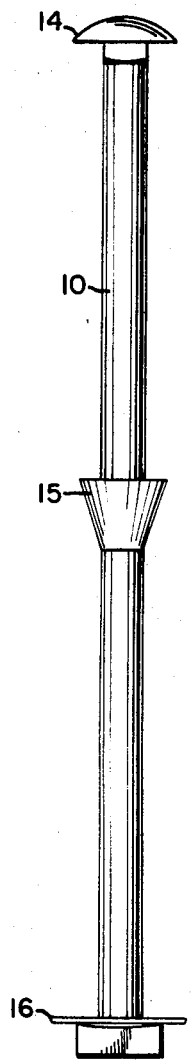
FIGURE 4 illustrates the construction of the rigid member or threadless bolt in one of its various lengths and diameters.
Figure 5:
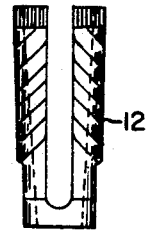
FIGURE 5 illustrates the multiple-segmented expansible unit anchoring device.

Referring now more particularly to the drawings, an improved expansive anchoring device is described with reference to FIGURES 1 through 15. The expansive anchoring device is preferably constructed of a rigid elongated member that is characterized as a two-headed, threadless bolt 10, as shown in FIGURE 4. The outer or bottom head 16 is shaped in a conventional manner to receive a turning force as from a wrench. Such a turning force is transmitted directly to the opposite end of rigid member 10 to bolthead 14 which is shown in FIGURE 4 to have the characteristics of the common carriage bolthead. Placed on the rigid member 10, adjacent to bolthead 14, is the expander actuator 13. In one embodiment, expander actuator 13 is in slideable and rotatable relationship with rigid member 10 except when the expander actuator is placed adjacent to bolthead 14. In this latter position a rectangular recess in the end of the expander actuator 13 mates with the square shank of bolthead 14 thus preventing the expander actuator 13 from rotating relative to the rigid member 10. In another embodiment, the expander actuator, may be welded or otherwise secured to bolthead 14 to prevent rotation relative to rigid member 10. In this embodiment the combined bolthead and expander actuator are illustrated at 17 in FIGURE 8. In even a third embodiment the combined expander actuator and bolthead 17 in FIGURE 8 may be integrally fashioned in a single forging or shaping operation directly on rigid member 10 as illustrated at 18 in FIGURES 9 and 10. The lower face of expander actuator 13, normal to the axis of rigid member 10, is shaped in the form of a cam or helical ramp. The shape of the cam is such that a cam follower in contact with the surface of the cam will receive a maximum displacement during the rotation of not more than 360 degrees of expander actuator 13. As can be seen in FIGURE 2 and FIGURE 3 the cam surface of expander actuator 13 achieves maximum displacement upon being rotated about 360 degrees. As can also be seen with reference to FIGURE 9 and FIGURE 10 the eliptical cam surface of combined bolthead-expander actuator 18 will achieve maximum displacement within a rotation of about 180 degrees. Other cam configurations and modifications to achieve maximum thrust within about 360 degrees are also contemplated within the scope of this disclosure. It is immaterial whether the cams operate on clockwise rotation or counterclockwise rotation. Clockwise rotation to conform to the average screw-thread rotation is generally desirable.

Figure 9:
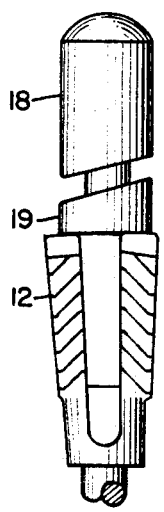
FIGURE 9 illustrates the expander actuator and tapered expander employing an alternative cam design.
Figure 10:
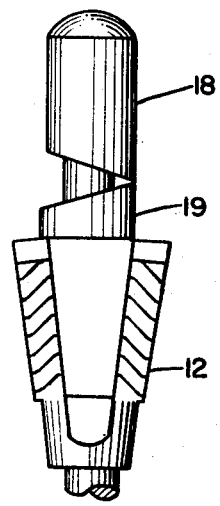
FIGURE 10 illustrates the expansible unit fully expanded through the employment of an alternative cam design.

Placed on the rigid member 10 adjacent to the expander actuator 13 is the tapered expander or wedging unit 13-A. The upper face of the tapered expander 13-A is shaped complementarily to the cam surface of expander actuator 13 in FIGURE 2. The opposite end of the tapered expander 13-A is shaped in a tapered wedge form as shown in FIGURE 2. An alternative tapered expander 19 having an eliptical upper cam surface conforming to bolthead-expander actuator 18 is shown in FIGURE 9 and FIGURE 10.

The pitch of the cam surfaces of expander actuators 13, 17 and 18 and of tapered expanders 13-A and 19 may conveniently be formed at 15 degrees but may be more or less depending upon the maximum amount of axial movement to be generated.

Placed on rigid member 10 adjacent to tapered expander 13-A, is the multiple segmented expansible unit 12 of conventional design. The multiple segments are integral and are separated along their extension for reasons of flexibility, but are attached to a ring-like base section that forms a hole of proper diameter to fit the rigid member 10. The segments of the expansible member 12 extend toward the tapered expander 13-A and overlay the tapered portion thereof.

If desired coiled spring 24 may be inserted between the end of tapered expander 13-A and the ring support of expansible member 12 as shown in FIGURE 13 to assist in the removal of an assemblage from a borehole when removal is deemed advisable or necessary.

Figure 12:
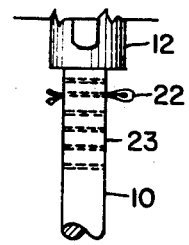
FIGURE 12 illustrates an alternative support for the expansible unit in the form of a pin installed in appropriately located apertures drilled through the rigid member.
Figure 11:
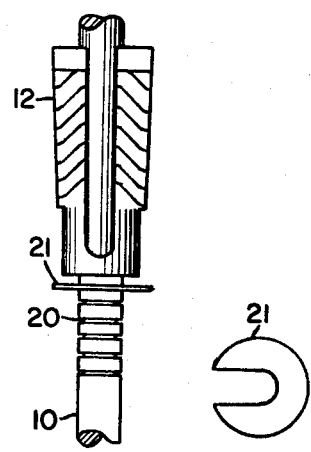
FIGURE 11 illustrates an expansible unit support in the form of a U-shaped collar installed in appropriate grooves cut into or over raised concentric rings formed onto the rigid member.

Adjacent to the ring portion of expansible member 12, an abutment 15 is formed on rigid member 10 to provide means to prevent the axial displacement of expansible member 12. Alternative means of preventing the axial displacement of expansible member 12 are illustrated in FIGURE 11 and FIGURE 12. For example a U-shaped retaining washer 21 fitted into conveniently spaced grooves 20, let into rigid member 10, or over concentric rings formed on rigid member 10, or a retaining pin or key 22 inserted into a conveniently drilled hole 23 in rigid member 10 are useful abutments for expansible member 12.

Figure 7:
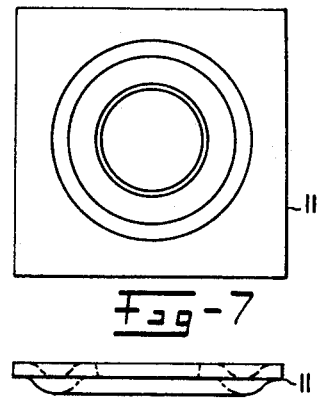
FIGURE 7 is a plan view of the substrate or roof bearing plate.
Figure 6:
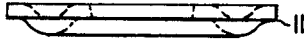
FIGURE 6 is an elevation view of the substrate or roof bearing plate showing a suggested structural design.
Figure 8:
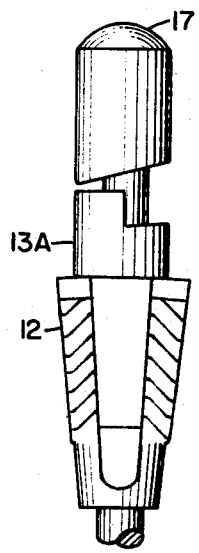
FIGURE 8 illustrates the expansible unit fully expanded.

For use as a roof bolt in securing safe support of rock strata in mining operations the expansive anchoring device is fitted with a suitable substrate or roof bearing plate 11 as illustrated in FIGURE 2, FIGURE 6 and FIGURE 7. If desired, a flat or spherical friction relieving washer may be interposed between roof bearing plate 11 and bolt head 16.

As illustrated in FIGURE 1 the diameter of expansible member 12 is preferably slightly greater than the diameter of bolthead 14, expander actuator 13 and tapered expander 13-A. This is to permit a frictional fit between expansible member 12 and the walls of the bore-hole into which the expansive anchoring device is inserted.

The materials of construction that may be employed in the manufacture of the expansive anchoring device may be metal, metal alloy, plastic or reinforced plastic material showing the properties required to meet the demands of use contemplated. Molded plastic parts may well be employed for such devices intended for light duty suspension of a variety of light-weight items in home of commercial buildings.

To minimize corrosion from environmental factors, the parts constructed of metal may be plastic coated or otherwise treated with known anti-corrosion coatings.

For use in securing rock strata from collapse in mining and excavating operations where personnel safety and continuity of operations are essential, materials of proven strength and performance are required and are specified by mine safety engineers accordingly.

In use, a bore-hole of suitable size is drilled in the substrate to accommodate the expansive anchoring device. The device is inserted until the roof bearing plate 11 is in contact with the substrate. Turning the exposed bolthead 16 clockwise using a suitable wrench transmits the rotary motion through the rigid member 10 to bolthead 14 and thence to expander actuator 13. As the cam surface of expander actuator 13 rotates it slides along the surface of the cam surface of the tapered expander 13-A causing tapered expander to move axially to bear against the inner surfaces of the expansible member 12 thus forcing the segments to move tangentially to bear with considerable force against the inner surface of the bore-hole. The initial friction between the expansible member 12 and the inner surface of the bore-hole prevents the expansible member 12 from rotating and the initial frictional contact between the tapered expander 13–A and the expansible member 12, in turn, prevents the tapered expander 13–A from turning in response to the rotation of the expander actuator 13. If desired, however, the tapered expander 13–A can be provided with one or more flutes or guides as illustrated at 25 in FIGURE 15, that fit between at least two segments of expansible member 12 thus assuring alignment during axial motion of the expander member 13–A. The abutment 15 prevents the expansible member 12 from moving axially away from the thrust of the tapered expander 13–A. When further tangential motion of the expansible member segments 12 is no longer possible within the torque limit imposed on bolthead 16, the expansive anchoring device is properly installed. Actual tests have confirmed that should the walls of the bore-hole crumble under less than the maximum torque to be applied to bolthead 16, the expander actuator will continue to rotate until it has passed its position of maximum axial thrust at which point the torque requirement to continue the rotation will be markedly less. Such response accordingly will signal the operator that a satisfactory installation has not been achieved.

If for any reason it is desired to remove the assembly once it has been installed, the application of a counter-clockwise force to bolthead 16 will release the cam pressure of expander actuator 13 on tapered expander 13–A. If spring 24 was installed initially it will act to lift tapered expander 13–A which will permit the segments of expansible member 12 to be forced inwardly toward the rigid member 10 as force is applied axially on bolthead 16 to withdraw the apparatus.

It is the goal of miners, mining engineers, and safety inspectors to have roof or rock bolts tightened to an acceptable torque tension relationship compatible with the hardness of the strata at the anchorage horizon. However, with the use of the present powerful, high speed equipment, the optimum torque tension relationship is not always obtained. Under normal conditions, the bolt makes numerous revolutions before the expansible unit tightens against the borehole wall, and on some occasions the expansive units will not tighten because of ill-fitting, rusty, or dirty threads. On other occasions, usually because of the powerful wrenches and the additional leverage of the threaded units, some bolts are prestressed in torsion to the point of failure, or broken completely off, especially when the strata at the anchorage horizon is hard enough to resist wrenching forces. If the strata at the anchorage horizon is of weak formation, it will crumble or flow during the wrenching process, thus enlarging the anchorage zone which in turn reduces the effectiveness of the expansion unit.

With the invention described herein through the selection of pitch angles for the cam surfaces employed with expander actuator 13 and tapered expander 13–A in connection with the proper selection of other parameters such as the size of the bore-hole in relation to the size of the expansive anchor device and the nature and hardness of the substrate, it is possible to select those combinations that will prevent the overstressing of the various parts to exceed the yield point or rupture value. Also, since the use of relatively fine screw threads is avoided, premature binding because of choked, corroded or damaged threads is avoided.

As mentioned above, the several parts of the improved anchoring device may be made of a variety of materials utilizing known shaping and forming techniques.

In the final assembly of the anchoring device, tapered expander 13–A is positioned on rigid member 10 with the cam surfaces of expander actuator 13 and tapered expander 13–A fitted for minimum separation between them. Spring 24, if it is to be installed is inserted on rigid member 10 in contact with the tapered end of tapered expander 13–A. Segmented expansible unit 12 is next inserted onto rigid member 10 with the segmental extensions overlaying and in contact with the tapered portion of tapered expander 13–A and in such an axial relation thereto that the maximum outer diameter of the segmented expansible member is slightly greater than the maximum diameter of tapered expander unit 13–A. With the use of temporary clamps or bindings the above-described relative position of tapered expander 13–A and expansible member 12 is maintained while abutment 15 is formed on rigid member 10 in contact with the ring end of expansible member 12. As disclosed above, the use of retaining washer 21 in a suitably placed groove 20, or over raised concentric rings, or the use of a retaining pin in a suitably drilled hole 23 may be employed to prevent axial movement of expansible member 12 toward bolt head 16.

It is obvious that the surfaces of the cams and the tapered surface of the tapered expander as well as the inner and outer surfaces of segments of the segmented expansible units may be serrated or textured to control the frictional characteristics thereof as required.

Having thus described my invention, it is obvious that various immaterial modifications may be made in the same without departing from the spirit of my invention; hence I do not wish to be understood as limiting myself to the exact form, construction, arrangement and combination of parts herein shown.

What is claimed is:

1. An anchor bolt apparatus comprising an expansible member means spreadable in a radial direction and a base part containing a central aperture, a tapered expander means for spreading radially said expansible member means, an expander actuator means containing a central aperture, said tapered expander means containing a central aperture, an elongated rigid member means passing through the central apertures of said expansible member means, said tapered expander means and said expander actuator means, said elongated member means terminating in an enalrged head, abutting the end of said expander actuator, connectible means adjacent said head which abuts said expander actuator to maintain a fixed circumferential relationship between said elongated rigid member means and said expander actuator means, said expander actuator means containing a cam surface means, said tapered expander means having a cam responsive means in contactable relationship with said cam surface means whereby rotation of said expander actuator relative to said tapered expander means cause said tapered expander means to move axially relative to said elongated rigid member, said expander actuator and said expansible member means so as to expand one end of said expansible member, said elongated rigid member containing an abutment means abutting the other end of said expansible member to prevent axial motion of said expansible member means away from said tapered expander means, a substrate bearing plate containing a central aperture, said elongated member means passing through the central aperture of said substrate bearing plate and terminating in an enlarged head means, said head means adaptable to receiving a torsional force.

2. The apparatus of claim 1 in which said cam surface means and said cam responsive surface means coact to produce maximum axial displacement of said tapered expander in not more than one revolution of said expander actuator.

3. The apparatus of claim 1 in which said cam surface means is a helical ramp.

4. The apparatus of claim 1 in which said cam responsive means is a helical ramp.

5. The apparatus of claim 1 in which said cam surface means and said cam responsive means each is an elipse in elevation view and a circle in plan view.

6. The apparatus of claim 1 in which said connectable means is a squared shank on said rigid member means, and said expander actuator means having a squared recess in mating relationship with said squared shank.

7. The apparatus of claim 1 in which said cam surface is serrated to restrict counter-rotation relative said tapered expander means.

8. The apparatus of claim 1 in which said expander actuator means is rigidly secured in abutting relationship to said enlarged head of said elongated member.

9. The apparatus of claim 1 in which said expander actuator and said enlarged head of said elongated member are integrally formed.

10. The apparatus of claim 1 in which a spring member means is interposed in separating relationship between the tapered end of said tapered expander and the base part of said expansible member.

References Cited

UNITED STATES PATENTS

| | | | |
|---|---|---|---|
| 1,031,462 | 7/1912 | Paine | 85—73 |
| 1,419,016 | 6/1922 | Capitosso | 85—74 |
| 1,850,768 | 3/1932 | Peirce | 85—74 |
| 2,944,437 | 7/1960 | Pickles | 85—61 |
| 3,139,730 | 7/1964 | Williams et al. | 85—69 |
| 3,247,754 | 4/1966 | Bieser | 85—73 |

FOREIGN PATENTS

| | | |
|---|---|---|
| 991,341 | 6/1951 | France. |
| 1,266,450 | 5/1961 | France. |
| 913,838 | 6/1954 | Germany. |

MARION PARSONS, Jr., *Primary Examiner.*